United States Patent
Reshetov et al.

(10) Patent No.: US 7,397,946 B2
(45) Date of Patent: Jul. 8, 2008

(54) COLOR DISTRIBUTION FOR TEXTURE AND IMAGE COMPRESSION

(75) Inventors: Alexander Reshetov, San Jose, CA (US); Yevgeniy Kuzmin, Moscow (RU); Denis Ivanov, Moscow (RU)

(73) Assignee: Intel Corporation, Santa Clara, CA (US)

( * ) Notice: Subject to any disclaimer, the term of this patent is extended or adjusted under 35 U.S.C. 154(b) by 766 days.

(21) Appl. No.: 10/764,314

(22) Filed: Jan. 23, 2004

(65) Prior Publication Data

US 2004/0151372 A1    Aug. 5, 2004

Related U.S. Application Data

(63) Continuation of application No. 09/607,669, filed on Jun. 30, 2000, now Pat. No. 6,819,793.

(51) Int. Cl.
*G06K 9/00* (2006.01)

(52) U.S. Cl. .................................................. 382/166

(58) Field of Classification Search ......... 382/162–167, 382/232–253; 358/119, 575, 539; 345/501–503, 345/552, 555, 587, 582, 597
See application file for complete search history.

(56) References Cited

U.S. PATENT DOCUMENTS

| | | | |
|---|---|---|---|
| 5,327,264 A * | 7/1994 | Iyama | .................. 358/515 |
| 5,327,509 A | 7/1994 | Rich | |
| 5,548,709 A | 8/1996 | Hannah et al. | |
| 5,751,292 A | 5/1998 | Emmott | |
| 5,808,621 A | 9/1998 | Sundaresan | |
| 5,822,452 A | 10/1998 | Tarolli et al. | |
| 5,845,013 A | 12/1998 | Bouchard et al. | |
| 5,852,443 A | 12/1998 | Kenworthy | |
| 5,943,058 A | 8/1999 | Nagy | |
| 6,940,511 B2 * | 9/2005 | Akenine-Moller et al. | .. 345/503 |

(Continued)

OTHER PUBLICATIONS

"Quantization of Color Images", *Proceedings of the European Conference on Computer Vision*, (1998), 563-577.

(Continued)

*Primary Examiner*—Ishrat Sherali
(74) *Attorney, Agent, or Firm*—Blakely, Sokoloff, Taylor & Zafman LLP

(57) ABSTRACT

A block decomposition based method is provided for compressing textures based on sharing color information between texture blocks. The texture map is divided into a plurality of texture blocks containing texels. During compression a first color value is stored for a first block and a second color value is stored for a second block. A palette is created for each texture block using the color values stored for several neighboring texture blocks. Each texel in each of the texture blocks is indexed to one of the colors in the palette. Accordingly the method compresses the information in the texture map by storing for each texture block bits representing a color value and bits to index each of the texels to a color in the palette, which allows sharing of color information between blocks. During decompression the palettes are regenerated and colors from the palette are assigned to the texels according to the stored index values. Accordingly, the decompression of the texture allows regeneration of the compressed texture, which may be mapped to surfaces to improve the visual quality of three-dimensional graphics.

11 Claims, 13 Drawing Sheets

U.S. PATENT DOCUMENTS 7,058,218 B1 * 6/2006 Drebin et al. ............... 382/167

OTHER PUBLICATIONS

J. Puzicha, M. Held, J. Ketterer, J. Buhmann, D. Fellner. On Spatial Quantization of Color Images. Technical Report IAI-TR-98-1, University of Bonn, 1998.

J. M. Buhmann, D. Fellner, M. Held, J. Ketterer and J. Puzicha. Dithered Color Quantization. Proceedings of Eurographics, vol. 17, No. 3, 1998.

FXT1: White paper. 3dfx Interactive, Inc. Retrieved from the internet at http://www-dev.3dfx.com/fxt1/fxt1whitepaper.pdf. pp. 1-7.

Texture and Rendering Engine Compression (TREC): White paper. Microsoft Corporation. Retrieved from the interent at http://www.microsotf.com/hwdevdes/WHNTREC.htm. pp. 1-11.

Paul S. Heckbert, PIXAR. "Survey of Texture Mapping". IEEE Computer Graphics and Applications, Nov. 1986, pp. 56-67. pp. 1-14.

J. Ketterer, J. Puzicha, M. Held, M. Fischer, J. M. Buhmann and D. Fellner. On Spatial Quantization of Color Images. Proceedings of the European Conference on Computer Vision, 1998. pp. 563-577.

Cross, "DXTn Texture Compression" at http:/www.cdmag.com/articles/021/068/dxt_feature.html, Jul. 1999.

Ivanov, "Texture Compression Survey" at http://www.fit.com.ur/Surveys/TextureCompression/index.html. Apr. 1999.

* cited by examiner

| FXT1 Scheme | Colors Stored | Palette Size | Bits / Texel |
| --- | --- | --- | --- |
| CC_HI | 2 | 8 | 3 |
| CC_CHROMA | 4 | 4 | 2 |
| CC_MIXED | 4 | 2x4 | 2 |
| CC_ALPHA | 3 | 2x4 | 2 |

*FIG. 2*

*PRIOR ART*

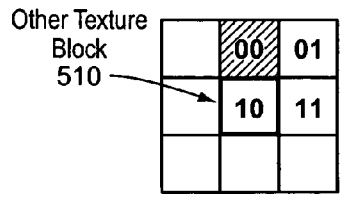 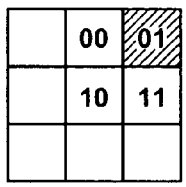 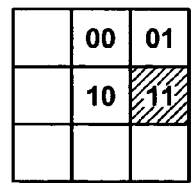 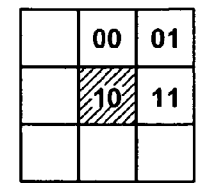
FIG. 5A    FIG. 5B    FIG. 5C    FIG. 5D
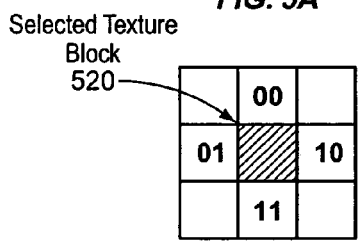 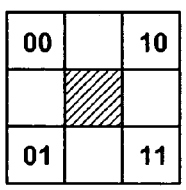 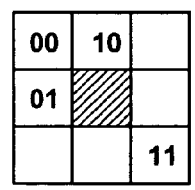 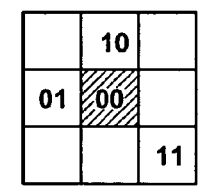
FIG. 5E    FIG. 5F    FIG. 5G    FIG. 5H
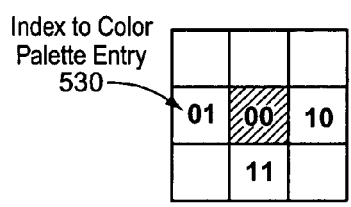 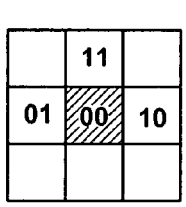 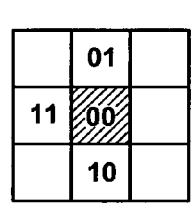 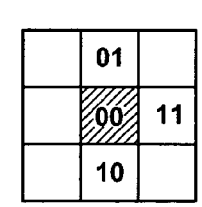
FIG. 5I    FIG. 5J    FIG. 5K    FIG. 5L
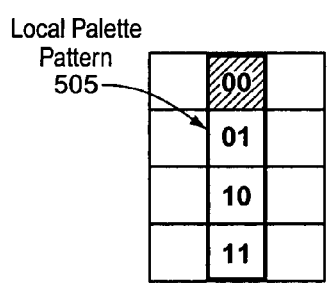 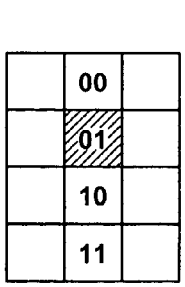 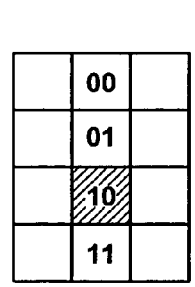 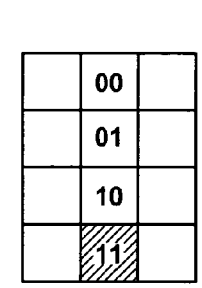
FIG. 5M    FIG. 5N    FIG. 5O    FIG. 5P
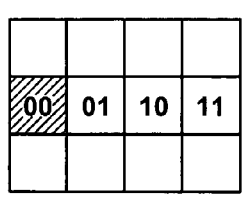 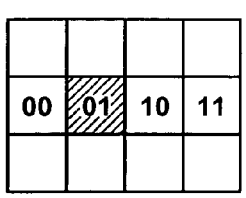 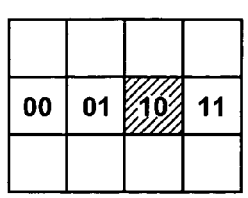 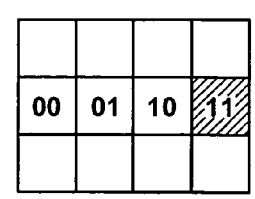
FIG. 5Q    FIG. 5R    FIG. 5S    FIG. 5T

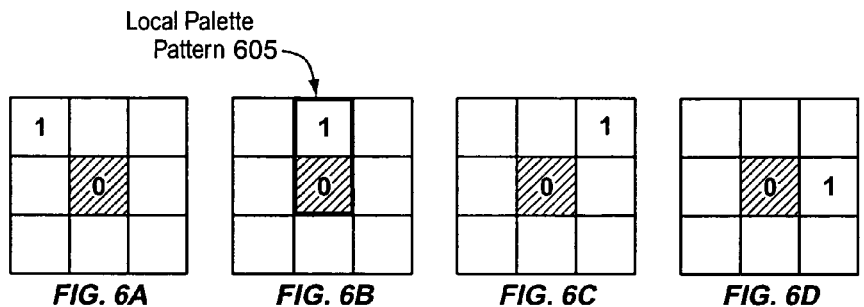
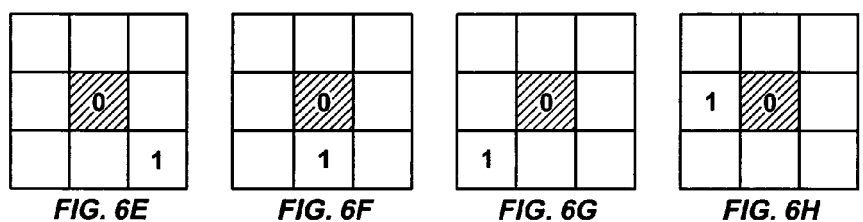
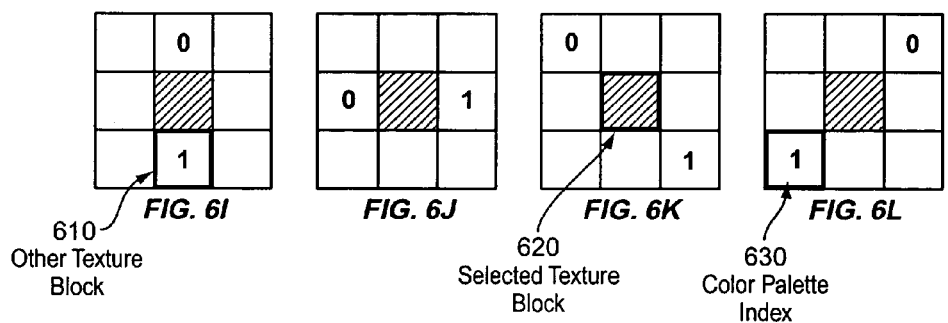
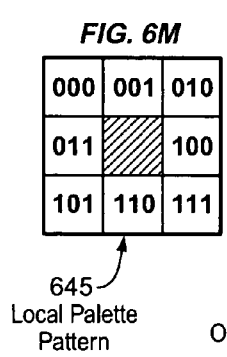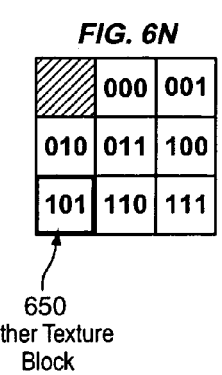
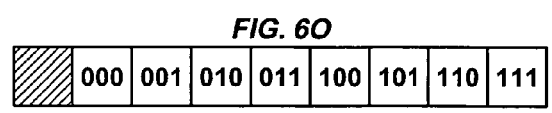
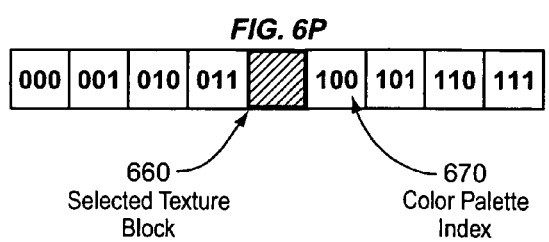

| Method | Red | Green | Blue |
|---|---|---|---|
| Uniform | 1.0 | 1.0 | 1.0 |
| S3TC Default | 0.309 | 0.609 | 0.082 |
| Other | 0.299 | 0.587 | 0.114 |

*FIG. 11*

COLOR DISTRIBUTION FOR TEXTURE AND IMAGE COMPRESSION

The present application is a continuation of U.S. patent application Ser. No. 09/607,669 filed on Jun. 30, 2000, now U.S. Pat. No. 6,819,793.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to compressing computer graphics information. More particularly, the invention relates to a system and method for compressing computer graphics and textures for three dimensional computer graphics.

2. Background Information

In order to provide realistic computer graphics with smooth continuous rendering rates, it is desirable to have fast access to a large number of high-quality detailed textures. This goal is somewhat constrained by system memory and memory access bandwidth limitations. Texture compression can be used to significantly reduce the memory required to store textures and the bandwidth required to access textures from memory. Thus, four qualities are typically important for texture compression methods: (1) high compression ratio, (2) sufficient quality of decompressed images, (3) fast decoding, and (4) fast access to any texel in any order. Methods having these qualities allow more and higher-resolution textures to be incorporated into graphics, and provide a more realistic, immersing experience.

Block decomposition is one approach to texture compression. This approach is based on dividing an image into equally sized blocks (typically, 4×4 texels) and storing each of them in a uniform manner, so that after compression each block takes the same amount of memory. Thus, all blocks may be stored row by row, and an offset of a block containing any individual texel may be easily calculated. Three prior art block-decomposition methods will be discussed below: (1) Microsoft's Texture and Rendering Engine Compression (TREC), (2) S3 Texture Compression (S3TC), and (3) 3dfx's Texture Compression (FXT1).

Texture and Rendering Engine Compression (TREC)

Texture and Rendering Engine Compression (TREC) was developed by Microsoft Corporation. This technique is very similar to the JPEG standard since it is based on the two-dimensional discrete cosine transform (DCT) of 8×8 pixel blocks and quantization of coefficients. This approach provides variable compression ratios with satisfactory visual quality. However, implementing a hardware DCT decoder on a graphics accelerator board only for texture decompression is relatively expensive.

S3 Texture Compression (S3TC)

FIG. 1 shows a representative indexed texture block 110 for compression of a 4×4 texel texture block according to the S3TC approach. This approach stores two color values 115 for the texture block. A reconstructed color palette 120, corresponding to indexed texture block 110, contains the two stored color values 115 and two interpolated colors 140. The interpolated color values 140 are determined by equations 160. A two-bit index 170 (e.g., 00, 01, 10, 11) is assigned to each of the texels in block 110, wherein each of the indices represents a color value in one of the four color palette entries 130 in the reconstructed color palette 120.

Because colors are stored in RGB565 format, palette information requires 32 bits per each texture block (two colors times 16 bits per color). Indices take another 32 bits per block (16 texels times 2 bits per texel). Thus, the compressed texture block requires 8 bytes, while the original takes 48 considering RGB888. Consequently, S3TC scheme provides 6:1 compression ratio.

3dfx's Texture Compression

FXT1 may be considered an extension of the S3TC approach, since it separately encodes equally sized blocks of 4×8 texels by small local palettes (look-up tables). FXTi has four modifications, however all the modifications have a common approach: (1) some basic colors (RGB555) are stored in a block, (2) a local palette (or palettes) is generated by interpolation of basic colors, and (3) each texel is represented by index of the most appropriate color from the corresponding look-up table.

FIG. 2 briefly presents the FXT1 encoding parameters for different modifications. For CC_HI scheme, two basic RGB555 colors, which are stored in a block, are used for interpolating seven RGB888 look-up table entries, while the eighth entry is defined transparent. Thus, three bits are required for each texel. CC_CHROMA refers to storing four colors, which are used with no change as the four-entry palette. CC_MIXED is very similar to the S3TC approach, since two four-entry palettes are generated, each by interpolating between two colors (therefore, four colors are stored for a 4×8 texel block). Then, two sub-blocks of 4×4 texels are encoded separately by their own palettes. CC_ALPHA creates an aggregate of two 4×4 texel texture blocks and stores three colors for that aggregate. The first and second colors are used as the primary colors of the left 4×4 texel texture block and the second and third colors are used as the primary colors of the right 4×4 texel texture block. Two additional colors are created for each texture block by interpolating between the two primary colors for that block. During compression, FXT1 encoder produces all representations of each 4×8 block of texels, chooses the one that introduces the least error, and stores the corresponding data in the resulting data stream.

Thus, S3TC represents each block of 4×4 texels by 8 bytes (4 for colors+4 for indices), while FXT1 uses a 16-byte data chunk for each 4×8 texel block. The compression ratio, provided by these techniques, is 6:1 for TrueColor 24 bpp images, and 8:1 for 32 bpp images.

Quality Degradation of Compressed Textures

One major problem with current texture compression methods including S3TC and FXT1 is an inadequate balance between visual quality and compression ratio. In the prior art, high compression ratio is achieved by serious reduction of color data available for texel representation. In general, the methods described above use interpolation to determine some colors, and the interpolated colors lack diversity. As a result, less independent colors are available to represent the image, and this may introduce perceptible quality degradation in some cases;

As an example, consider an image having three colors that do not belong to one line in an RGB cube. For instance, it may be red, green and blue. If pixels of these colors appear in one block simultaneously, many prior art methods will not be able to reproduce them without visual degradation by interpolation of any two. It will either discard less frequent color or construct a line (in an RGB cube) being less distant from all existing points. This will often introduce perceptible quality degradation effects as shown in FIG. 3. FIG. 3 shows an original image 310 where shades of gray are used for representing a red flower 320 with a blue core 330. As shown for the S3TC method of compression 340, compression and reconstruction using S3TC resulted in regions with quality degradation 360 because only two basic independent colors were available.

BRIEF DESCRIPTION OF THE SEVERAL VIEWS OF THE DRAWINGS

The novel features believed characteristic of the invention are set forth in the appended claims. The present invention is illustrated by way of example, and not by way of limitation, in the figures of the accompanying drawings and in which like reference numerals refer to similar elements. The invention itself, however, as well as a preferred mode of use, will best be understood by reference to the following detailed description of an illustrative embodiment when read in conjunction with the accompanying drawings:

FIG. 2 conceptually illustrates another prior art texture compression technique.

FIG. 5 conceptually illustrates exemplary local palette patterns based on four color palettes that may be used for palette construction and block reconstruction.

FIG. 6 conceptually illustrates exemplary local palette patterns, (a) based on two color palettes, or (b) based on eight color palettes, which may be used for palette construction and block reconstruction.

FIG. 11 conceptually illustrates different weighting factors on individual RGB color components according to one embodiment for calculating color differences.

DETAILED DESCRIPTION OF THE INVENTION

Figure 1:
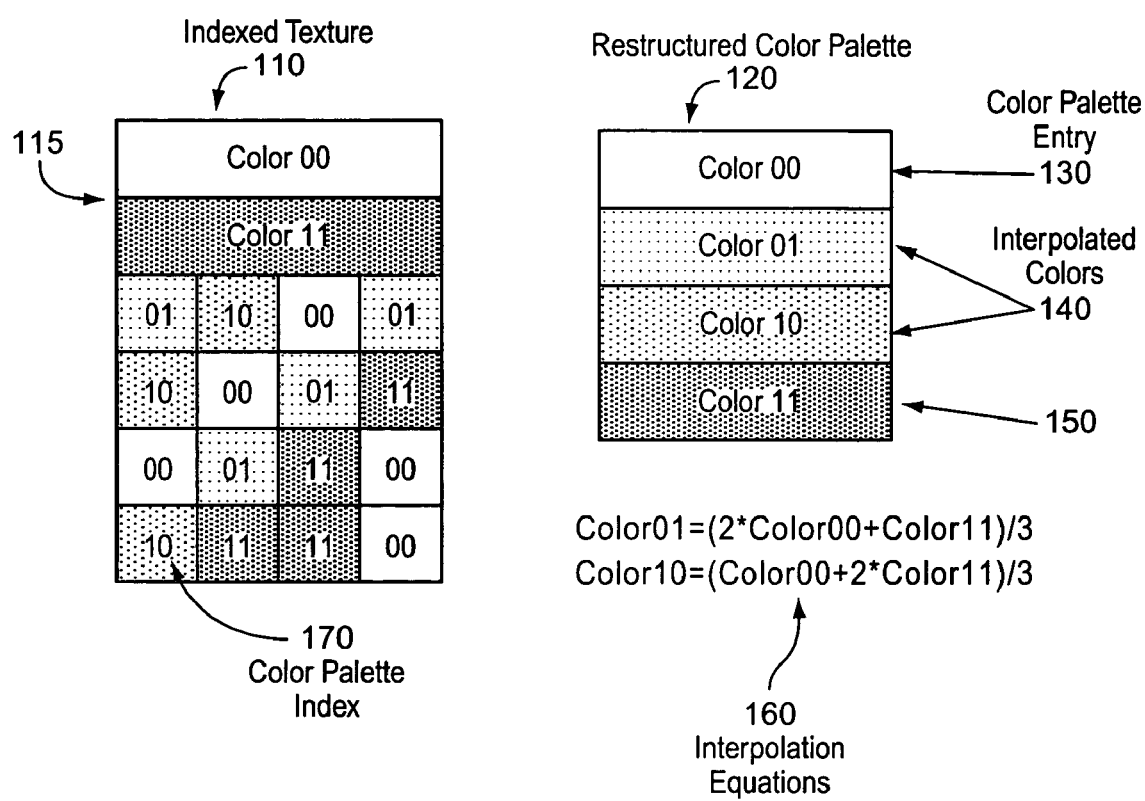
FIG. 1 conceptually illustrates a prior art texture compression technique.
Figure 3:
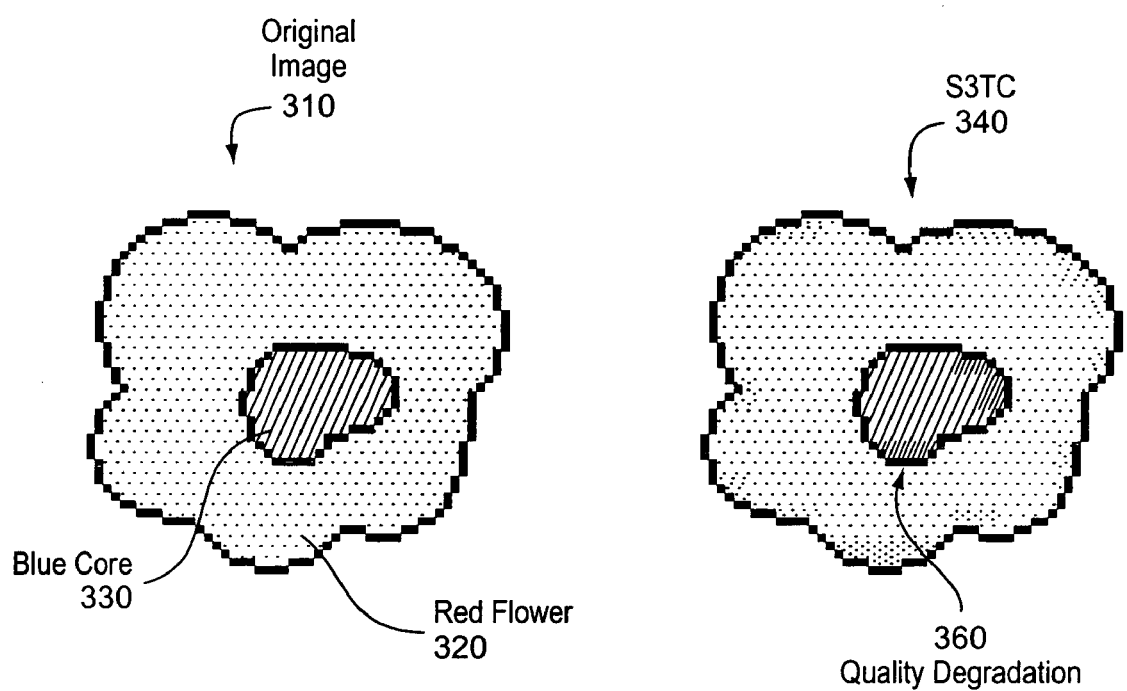
FIG. 3 conceptually illustrates the visual degradation of images compressed by prior art techniques.

A method and apparatus are described for performing compression and decompression of an image. Broadly stated, embodiments of the present invention seek to provide a color palette for a block of the image wherein at least one of the colors in the color palette is associated with another block. According to one embodiment of the present invention, the image is a texture and the block is a texture block containing texels. According to one embodiment the compressed information for a block includes information representing a single color value. Advantageously, the present invention permits high quality compression and decompression of images including textures while maintaining high compression ratios.

In the following description, for the purpose of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product that may include a machine-readable medium having stored thereon instructions that may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, most of the embodiments of the present invention are described with regard to texture compression rather than image compression. However, the present invention is not so limited. Methods for texture compression and image compression have two common objectives namely: (1) high compression ratios, and (2) no visible image degradation. The present invention satisfies both of these objectives. Additionally, texture compression requires fast real-time decoding and efficient random texel access. Fast decoding and random access are of high importance for texture encoding techniques because texels are usually fetched randomly during rendering and they should be decoded as fast as possible to provide appropriate fill-rates. Accordingly, by meeting the requirements for texture compression the method of the present invention is equally applicable to image compression. The practical use of the present invention to image compression is application dependent however.

Terminology

Before providing a detailed explanation of the present invention and various exemplary embodiments of the present invention, some terms that will be used throughout this application will briefly be defined.

Cache Effectiveness: Cache effectiveness in the context of the present invention, involves accessing texture information from main memory, storing that texture information in a faster local memory, and performing a high percentage of the tasks that require that information while that information is stored in the local memory. Preferably, the method for compressing and decompressing textures would make generally efficient use of the local cache to avoid duplicate memory accesses. For example, as an implementation detail, certain local palette patterns for certain applications may require fewer memory accesses than other local palette patterns.

Compressed Texture Information: The information used to represent one or more texture blocks. In one embodiment, compressed texture information for a single texture block includes bits representing a color value and bits for each of the texels to represent an index to a color value in the color palette for that block.

Error Function: An error function may be used to quantify the ability of one or more color palettes to represent the original color values for a group of texels. The error function may be composed of a sum of individual texel error contributions. For example, an error function may be the sum (over all texels in a texture block) of the squared minimum difference between each original texel color value and one of the color values from the color palette. The squared minimum difference is used to avoid positive differences negating negative differences, and an absolute value or other means may also be used.

Local Palette Pattern: Information that indicates which texture blocks and which colors are used to construct a color palette for a selected texture block. In one embodiment the local palette pattern is a matrix the same size as the local surrounding. Non-zero elements of this matrix indicate that corresponding neighbor blocks should be used for generating a local palette. The local palette pattern may be the same for all blocks of an image, however it may also differ from block to block and in this case it should be stored for each particular texture block.

Local Surrounding Blocks: The local surrounding blocks for a selected texture block are the group of blocks (typically 2×2 or 3×3) that includes the selected block and other texture blocks used for generating local palettes. Typically, the local surrounding blocks are adjoining texture blocks.

Color Palette: A color palette generally refers to a plurality of colors that are used to color texels during texture decompression. The color palette is created during texture compression, typically by iteratively changing color values from the color palette to reduce the error function. Information used to reconstruct the color palette is preserved during texture compression by storing bits of data representing each color in the palette. Also during texture compression, each texel that has access to a given color palette is indexed to a color in that palette by typically one, two, or three bits. During texture decompression, the indexes stored for each texel are used to recolor each texel with the color represented in the palette by the index.

Regional Color Similarity: The expectation that on average adjoining texture blocks will have more common colors than non-adjoining texture blocks.

Texel: A texel is a point element of a texture. In the context of the present invention, texels have a pre-compression state, for example an original texel color, and a post-compression state, for example an indexed texel color. Typically, the indexed texel color is a color in a color palette associated with the texture block that contains the texel and is indexed to the texel by way of storing an index for the texel during compression. The original texel color and indexed texel color need not be different, although they may be.

Texture: A texture is an image that is used to enhance the appearance of surfaces in three-dimensional graphics. Textures may be one-dimensional, two-dimensional or multidimensional textures, including MIPS maps.

Texture Blocks: Portions of a texture that contain a plurality of texels. Texture blocks may be overlapping texture blocks and non-overlapping (two texture blocks that do not have any texels in common) texture blocks. Typically texture blocks are square or rectangular. Typically, texture blocks are also naturally aligned meaning that the texture blocks are aligned along rows and columns. For example, in one embodiment a texture block comprises a 4×4 block of non-overlapping texels.

Texture Compression: A process that seeks to reduce the amount of information in bits that is required to represent a texture. For example, rather than storing individual color values for each texel, texture compression may be used wherein color palettes are created, the colors from the palettes are stored, and indexes for each texel to a color in the palette is stored.

Texture Decompression: Reconstructing a texture and re-coloring the texels using compressed texture information that is created during texture compression.

Texture Mapping: Texture mapping incorporates a texture into the surface of an object in an image. Typically the mapping involves incorporating a two dimensional array of texels into a group pixels representing a three-dimensional surface in the image.

Texture Compression may Enhance Texture Mapping

Texture mapping involves storing a texture in a memory addressed by (s,t,r) texture coordinates. When a texture is mapped to a polygonal surface (e.g., a triangle), the vertices defined in terms of (x, y, z) coordinates are mapped into the texture coordinates. The texture coordinates index to and define a region of the texture stored in memory. When objects in the image are close, as few as one texel may be mapped to one or more screen pixels. When objects in the image are distant, multiple texels may be averaged and mapped into one screen pixel. Texture mapping hardware is conventionally provided with information indicating the manner in which the texels in a texture map correspond to the pixels on the display screen that represent the object. At each of the polygon's pixels, the texture value is determined, using interpolation if necessary. Characteristics of the pixel (typically color) are modified by incorporating the characteristics of the texel or texels that are mapped to that pixel. The end result of texture mapping is covering the surface of the polygon with a portion of the texture.

In order to provide realistic computer graphics with smooth continuous rendering rates, it is desirable to have fast access to a large number of high-quality detailed textures. This goal is somewhat constrained by memory and access bandwidth limitations. Using texture compression significantly reduces the memory required to store textures and reduces the memory bandwidth required to access texture data from the memory.

Exemplary Computer Architecture

Embodiments of the present invention may be implemented in hardware or implemented in software. For example, dedicated hardware may be provided to carry out part or all of the operations of particular embodiments of the present invention. In the alternative, particular embodiments may be implemented as a software pipeline. The choice between these two is application dependent.

As discussed herein, a "system", such as the system for compressing computer graphics and textures, may be an apparatus including hardware and/or software for processing data. The system may include, but is not limited to, a computer (e.g., portable, laptop, desktop, server, mainframe, etc.), hard copy equipment (e.g., printer, plotter, fax machine, etc.), banking equipment (e.g., an automated teller machine), and the like.

Figure 4:
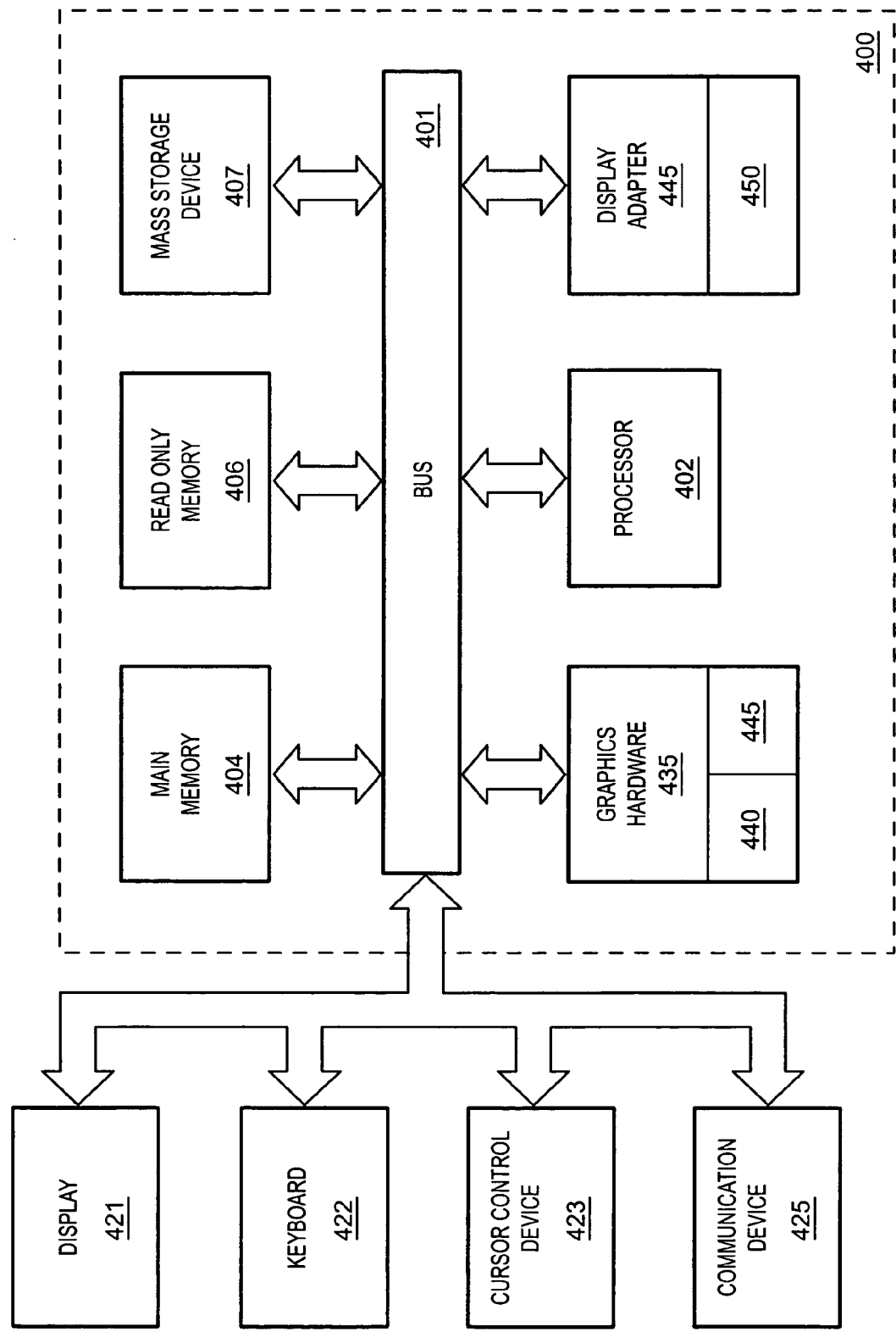
FIG. 4 is a block diagram of a computer system upon which one embodiment of the present invention may be implemented.

A computer system 400 representing an exemplary workstation, host, or server in which features of the present invention may be implemented will now be described with reference to FIG. 4. Computer system 400 represents one possible computer system for implementing embodiments of the present invention, however other computer systems and variations of computer system 400 are also possible. Computer system 400 comprises a bus or other communication means 401 for communicating information, and a processing means such as processor 402 coupled with bus 401 for processing information. Computer system 400 further comprises a random access memory (RAM) or other dynamic storage device 404 (referred to as main memory), coupled to bus 401 for storing information and instructions to be executed by processor 402. Main memory 404 also may be used for storing temporary variables or other intermediate information during execution of instructions by processor 402. For example, main memory 404 may be used to store compressed texture information. Computer system 400 also comprises a read only memory (ROM) and/or other static storage device 406 coupled to bus 401 for storing static information and instructions for processor 402.

A data storage device 407 such as a magnetic disk, zip, or optical disc and its corresponding drive may also be coupled to computer system 400 for storing information and instructions. For example, data storage device 407 may be a compact disk from which textures to be compressed are loaded. Computer system 400 may also be coupled via bus 401 to a display device 421, such as a cathode ray tube (CRT) or Liquid Crystal Display (LCD), for displaying information to an end user. For example, three-dimensional graphics incorporating textures may be presented to the end user on the display device 421. Typically, an alphanumeric input device 422, including alphanumeric and other keys, may be coupled to bus 401 for communicating information and/or command selections to processor 402. Another type of user input device is cursor control 423, such as a mouse, a trackball, or cursor direction keys for communicating direction information and command selections to processor 402 and for controlling cursor movement on display 421.

A communication device 425 is also coupled to bus 401. Depending upon the particular implementation, the communication device 425 may include a modem, a network interface card, or other well-known interface devices, such as those used for coupling to Ethernet, token ring, or other types of physical attachment for purposes of providing a communication link to support a local or wide area network, for example. In any event, in this manner, the computer system 400 may be coupled to a number of clients and/or servers via a conventional network infrastructure, such as a company's Intranet and/or the Internet, for example.

The computer system 400 may also comprise graphics hardware 435. The graphics hardware 435 may include a local memory that stores data representing a texture associated with the object being rendered. The graphics hardware may include a primitive rendering pipeline and may also include a separate dedicated pipeline for texture information. Having a separate pipeline avoids, when a new texture is to be mapped, the necessity of emptying the primitive rendering pipeline before the new series of MIP maps may be downloaded. This necessity of flushing the primitive rendering pipeline each time a new texture is required reduces the system's bandwidth. The graphics hardware 435 may comprise a graphics accelerator 440 and an Accelerated Graphics Port (AGP) 445. The AGP 445 may be used for passing graphics data including compressed texture information to the graphics accelerator 440 while the system memory services an operating system and other applications.

The computer system 400 may have a display adaptor 445 that prepares information for display on the display device 421. The display adapter 445 typically has an area of memory or frame buffer 450 used to hold a frame of data. For example, a bitmapped image may be held in the frame buffer 450 while the image is transferred to the display screen. A frame buffer is typically sized according to the maximum image that can be displayed on the monitor screen.

The present invention is not limited to any graphics display standard. In one embodiment the invention may be used in connection with one of the earlier standards that use digital signals, for example MDA, CGA, or EGA. In another embodiment, the invention may be employed on a PC that supports the VGA standard. In another embodiment, the color distribution techniques of the present invention may be used in connection with newer standards, such as SVGA or XGA.

Color Distribution Basics

In order to balance texture compression and image quality retention, the present invention proposes a different approach that does not require interpolation of two or more colors stored for a texture block. Instead, embodiments of the present invention are based upon constructing a color palette for a texture block based upon colors stored for other texture blocks. Thus, in general, the idea is to use colors associated with and stored for other blocks instead of simply interpolating colors stored in the current texture block.

Importantly, any set of texture blocks in the texture may be used for constructing the color palette of a texture block. However, if relatively distant blocks are used to generate the palette several memory calls may be required (as is the case with VQ methods). Thus, the choice of neighboring texture blocks can improve the efficiency of the method as well as improving hardware compatibility. Additionally, textures as well as images tend to exhibit regional color similarity, making it desirable for the color palette for a block to be based on proximate texture blocks rather than distant texture blocks. Because of these advantages, one embodiment of the present invention seeks to use colors from other texture blocks that are adjacent to or at least proximate to the texture block for which the color palette is being generated.

FIGS. 5A-5T shows several local palette patterns 505 for constructing a four-entry color palette for a selected texture block 520. The selected texture block 520 is identified with hatching, and the other texture blocks 510 that are used in constructing the color palette are identified by a two-bit index 530 (e.g., 00, 01, 10, 11) into a color palette. Each texture block with an index 530 may store zero, one, or more colors, preferably one color, for contribution to the color palette. The color palette, which is based upon these patterns, may or may not include the color stored for the selected texture block 520. The palette may or may not have two or more color value entries that are the same color. All patterns show other texture blocks 510 proximate to the selected texture block 520, because of the aforementioned advantages, however the invention is not so limited. Other patterns, including patterns wherein the other texture blocks 510 are distant from or seemingly randomly scattered about the selected texture block 520 are also contemplated by the present invention.

FIGS. 6A-6P show several local palette patterns 605, 645 for constructing a two-entry color palette (FIGS. 6A-6L) or an eight-entry color palette (FIGS. 6M-6P) for a selected texture block 620, 660. The selected texture block 620, 660 is shown hatched and the other texture blocks 610, 650 used to construct the palette are identified by a color palette index 630, 670. At least a one-bit index 630 is required to represent the two-entry color palette (e.g., 0 and 1) and at least a three-bit index 670 is required to represent the eight-entry color palette (e.g., 000, 001, 010, 011, 100, 101, 110, and 111). Due to the large numbers of local palette patterns 605, 645 possible, especially for the eight-entry color palette, only a few of the many possible combinations are shown. Other local palette patterns 605, 645, including patterns wherein the other texture blocks are distant from or seemingly randomly scattered about the selected texture block are also contemplated by the present invention.

It may be necessary to modify the local palette pattern for blocks at or near the edge of a texture. For example, for a block on the bottom row of a texture there may not be a block below the block. Accordingly, different proximate blocks may be used or the block may wrap around to reference blocks in the top row. Alternatively, the non-conforming edge blocks may store additional colors for inclusion in the palette to make up for the colors not provided by missing blocks. In one embodiment, a different local palette pattern may be created. These are all considered implementation details that are specific to the chosen local palette pattern.

Figure 7:
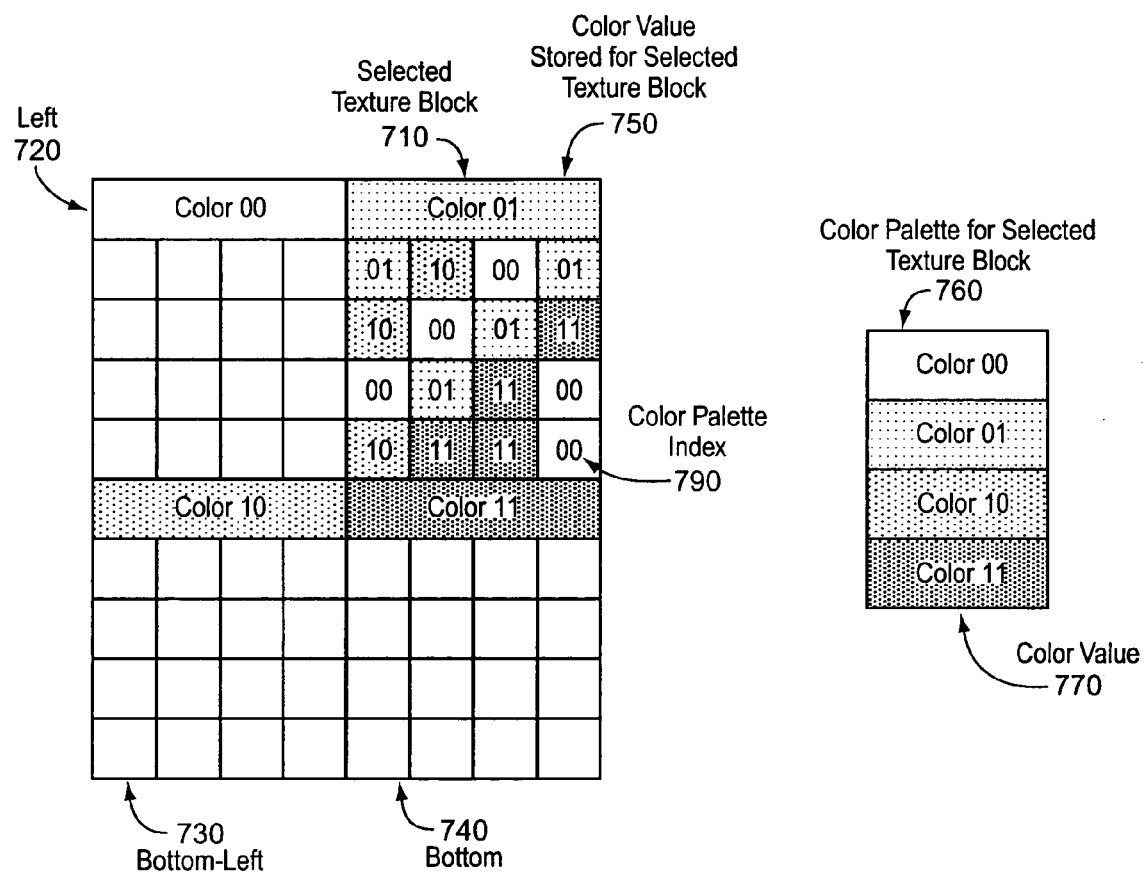
FIG. 7 conceptually illustrates a local palette pattern and color palette according to one embodiment.

FIG. 7 illustrates a local palette pattern for constructing a color palette for a selected texture block based on creating a color palette using four unique colors stored for a selected texture block and three adjacent texture blocks. Storing one color for each of the four texture blocks provides the advantage of being able to index into a four-entry color palette using only two bits. The pattern allows the texture compression processing to take full advantage of regional color similarity in choosing the colors for the four texture blocks, and is expected to provide good cache efficiency due to the blocks being closely packed. This pattern will be described in more detail below, by way of presenting a detailed example of the method based upon this local palette pattern.

In one embodiment, a matrix having values corresponding to neighbor blocks is used to represent the local palette pattern. Preferably, the local palette pattern is the same for all blocks of an image and therefore it is not required to be stored in each block. However, in alternative embodiments, this pattern may be different and may need to be stored for each texture block.

Compression Processing in General

Figure 8:
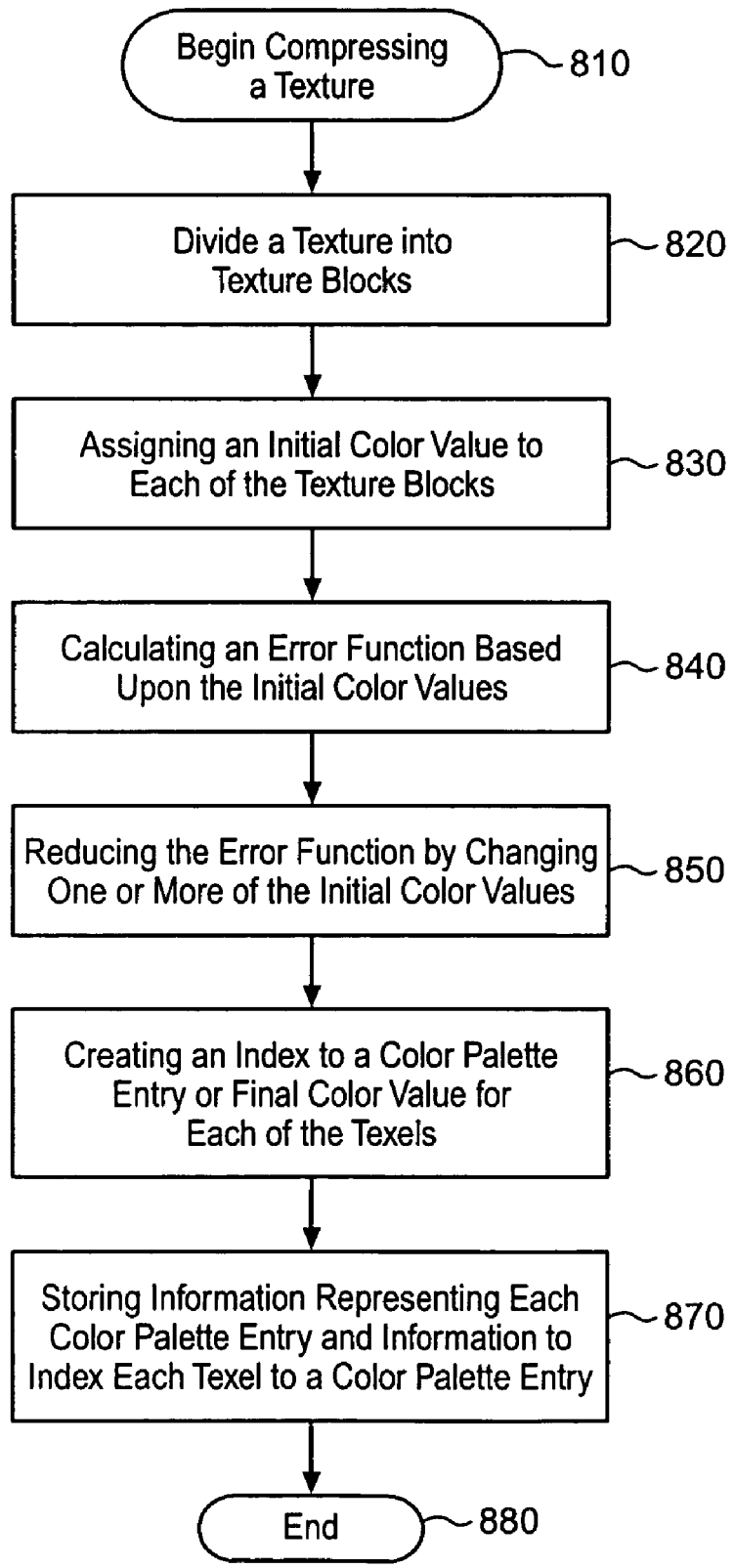
FIG. 8 is a flow diagram illustrating high-level texture compression processing according to one embodiment.

The method is generally characterized by but not limited to the following the steps shown in FIG. 8. At block 810 the compression of a texture is initiated. For example, textures to be used by an application (e.g., a graphics intensive video game) may be stored on a compact disk (CD) to be loaded onto the hard drive or into RAM of a computer. Compression of the textures will reduce the amount of storage required to store the textures as well as reducing the time required to transmit the texture information from the storage to the texture processing. For example, textures may be compressed from the CD and stored on the hard disk of the computer for later use. In this scenario, texture compression may be performed prior to real-time use of the textures. Accordingly, the time required for compression of the textures is not as important as the time required for decompression and optimization at the compression stage is not significantly limiting as long as decompression is fast and efficient.

At block 820 a texture is divided into a plurality of texture blocks. In the broadest sense a texture block is a plurality of texels. Typically the texture blocks are non-overlapping texture blocks. Also, typically the texture blocks are square or rectangular texture blocks and are also naturally aligned. However, the present invention is not so limited. In one embodiment, texel blocks are square naturally aligned and non-overlapping 2×2, 4×4, 4×8, or 8×8 blocks of texels. In one embodiment texture blocks are formed by single horizontal or vertical lines of texels, for example lines of 4, 8, 12, 16, 20, 24, 28 or 32 texels. Other sized blocks of texels may also be used.

In one embodiment, the texture blocks may be of different sizes and the size of the texture block may be stored with the block. In another embodiment, the number of texture blocks in a particular region of the texture depends upon the amount of color heterogeneity in the particular region. For example, in a region having only a single color, it is possible to use a large block storing a single color rather than many smaller blocks storing the same color.

At block 830, zero, one, or more initial color values are assigned to each of the texture blocks. The color values may be information to represent the color in one standard, such as RGB565, RGB888 or others. The color value does not have to be the color value of any texel in the texture block, although it may be in some embodiments. The color value may have to be discretized, and in some cases an adjustment may have to be made to make a calculated color value match a discretized color value in a standard (e.g., RGB565). The function of assigning an initial value may be simply providing a starting point from which the values may be optimized or may be used to provide a reasonably close condition for compressing the image. Accordingly, depending upon the particular application a reasonably sophisticated or relatively arbitrary method may be used to assign the initial values. Some exemplary initial value assignment methods are described below.

In some embodiments, the assignment of initial color values can be relatively arbitrary. In a first embodiment, a predetermined color value may be assigned as the initial color value for a texture block. In another embodiment the same color value is assigned as the initial color value to a plurality or all of the texture blocks. In an extension of this embodiment, different predetermined color values are assigned as the initial color values for texture blocks that make share a common color palette. In one embodiment color values are chosen for texture blocks sharing a color palette with enough color diversity that optimization may not be required. For example, color stored for four texture blocks that share a color palette may be red, green, blue, and yellow. Alternatively, rather than predetermined color values, randomly selected color values could be assigned as the initial color value for a texture block.

In other embodiments, the assigned initial color values may depend upon the uncompressed color values of one or more texels. In some embodiments the texels of the selected texture block may be used to assign the initial color. In one embodiment the average texel color value for a texture block is assigned as the initial color value for that texture block. In another embodiment the assigned initial color value for a texture block is one of the uncompressed texel color values. As an extension of this embodiment, the color value used by a large number of texels in the texture block may be assigned as the initial color value for that texture block.

In other embodiments, texture blocks from the local palette pattern for a selected texture block can be used to assign initial color values. In one embodiment the average texel color value for all of the texels for all of the blocks in the local palette pattern can be used as the initial color value for a texture block. Alternatively, the color value used by one or more or a majority of the texels from texture blocks that form a local palette pattern for a selected texture block may be assigned as the initial color value for the texture block.

In other embodiments, uncompressed texel color values from texture blocks outside the local palette pattern or from the entire texture may be used to assign initial color values. In one embodiment the average texel color value over all the texels in the texture may be assigned as the initial color value for one or more texture blocks. The present invention is not limited to the above-mentioned ways to assign an initial color value to the texel. Various other ways are contemplated by the present invention.

At block 840 an error function is calculated based upon the initial color values assigned to the texture blocks. This is optional, since the texture may be compressed based upon the initial color values. However, reducing the error function is preferred in order to better preserve the visual qualities of the uncompressed image. The function of the error function is to generally represent the quality of the color values assigned to the texture blocks to represent the texture after compression. Accordingly, any error function that can be devised to accomplish this objective, even somewhat poorly, may be used with the present invention and is contemplated by the present invention.

The error function may involve first assigning each texel to one of the colors in the color palette by way of an index. However, this assignment essentially involves calculating a difference between the texel color value and each of the color values in the color palette. Accordingly, these differences may be calculated and the minimum difference preserved for the error function. In one embodiment the error function contains a difference between the assigned color value, for one of the texture blocks that share the same color palette as the texel, and the color value of the texel in the uncompressed texture. Alternatively, the error function may include the square of this difference. In another embodiment the error function includes the absolute value of this difference. The error function may involve a sum. For example, the error function may involve a sum over all the texels in a texture block, all the texels that share a common palette, or all the texels in the texture. Summing an error function over all of the texels in the image has advantages, since changes made to a texture block used for one color palette may effect other color palettes and the error should account for impacts on the error function outside of any given color palette. In another embodiment, the error function is based upon a ratio of an uncompressed texel color and a color value from a color palette accessible to that texel.

At block 850 one or more of the assigned initial color values is changed in order to reduce the error function. This may or may not be performed depending on the application. However, because texture compression may be done offline rather than in real-time, it is often advantageous to perform compression with optimization in order to preserve the qualities of the uncompressed texture. The function of this is to reduce the error function by changing one or more color values and thereby improving the preservation of qualities of the texture after compression. The present invention is not limited to any particular way of accomplishing this reduction in the error function, and any method that generally accomplishes this function is contemplated by the present invention. In the preferred embodiment the error function is reduced sufficiently in consideration of the computational resources and specific needs of the problem.

In one embodiment an optimization technique may be used to reduce the error function. The optimization may minimize the error function or reduce it to an acceptable level by changing one or more color values assigned to texture blocks. Color values may be changed repeatedly (beyond the initial color values) to further reduce the error function. In one embodiment, a brute-force method such as a Monte Carlo method is used to achieve the optimization, however this method may be computationally demanding relative to other methods.

In another embodiment the Greedy Algorithm, or a modification thereof is used to perform the optimization. A discussion of the use of an exemplary formalized version of the Greedy Algorithm is provided in Appendix A. Also, an exemplary simplified version of the Greedy Algorithm that does not achieve the minimum error, but which provides satisfactory results, is provided in Appendix B. Further background information on the Greedy Algorithm is widely available, including *Fundamentals of Computer Algorithms*, E. Horowitz and S. Sahni, Computer Science Press, 1978 (ISBN 0-914894-22-6). Alternatively, other analogous optimization algorithms may be used to perform the desired level of optimization. A third exemplary method of optimization, based upon Iterative Conditional Mode (ICM) is provided in Appendix C. As discussed in these appendices, texture blocks may be assigned a priority to improve the optimization. The appendices are provided to assist in implementation of embodiments of the present invention, but the invention is not limited to or by these methods, since the optimization method is optional, and if implemented is a method of choice. Even if these Appendices contain mistakes or omissions, those skilled in the art would be able to use the information contained in these Appendices to optimize according to various embodiments of the present invention.

In other embodiments sophisticated optimization techniques are not required. In one embodiment the color value assigned to a texture block with a high error (texels in the block are relatively different from color palette entries for that texture block) is changed until the error has been substantially reduced. As an extension of this embodiment, another embodiment repeats this procedure for a plurality of texture blocks with high error.

At block 860 each of the texels that share a color palette is assigned an index to a color entry in the color palette. First, a color palette is created for a first texture block using at least one color associated with and stored for a second texture block according to a predefined local palette pattern. Several possible predefined patterns were shown in FIGS. 5A-T and 6A-6P. Next, the original color of each texel in the texture block is compared to the color values in the color palette to determine the color palette entry that is similar or most similar to the original color of the texel. Then, an index that identifies that similar color palette entry for each texel in a texture block is stored for the each texel.

At block 870, compressed texture information is stored for each texture block. The information may comprise bits representing zero, one, or more color values stored for a texture block, bits representing indices for texels into the color palette and identifying a particular color palette entry, and may include information representing the local palette pattern or information representing the other texture blocks used to construct the color palette. In one embodiment, information representing a color value may be information representing a RGB565 (or other standard) color value. In general, color may be represented in any format or space that is compatible for a particular application (e.g., RGB, CMYK, YUV, etc.). In one embodiment the information representing the local palette pattern is not required. Local palette pattern may be stored for each block. For example, this may be the case when the pattern is not constant for the whole texture. The number of bits for the indices depends upon the number of color palette entries. In one embodiment the bits representing indices for texels may be one-bit, two-bit, three-bit, or higher-bit combinations.

In other embodiments a texture block may store more than one color, which will be processed differently. In this case additional bits may be added to the index used for each texel to index into the reconstructed color list of the texture block.

In general, most embodiments of the present invention provide better image quality than prior art compression methods. This is because most embodiments provide more independently unique colors per texture block. Some prior art methods use two basic colors and two interpolated colors, but these prior art methods on average do not provide the same quality as a method that provides, for example, four independent colors. This is because the two interpolated colors are not independent, and therefore have underlying color similarity to the two basic colors. On average, this dependency as expected degrades the quality of the compression that can be achieved. Thus, in some embodiments, the present invention achieves better compression quality by providing more independent basic colors.

In general, most embodiments of the present invention also provide faster decompression than prior art methods. This is partly a result of not having to perform interpolation of colors in order to provide the color palette. In some embodiments, the present invention does not use any computation beyond directly accessing a texel and all colors. The simplicity of decompression according to some embodiments of the present invention makes those embodiments very well suited for hardware implementation, including use in graphics accelerators.

Figure 9:
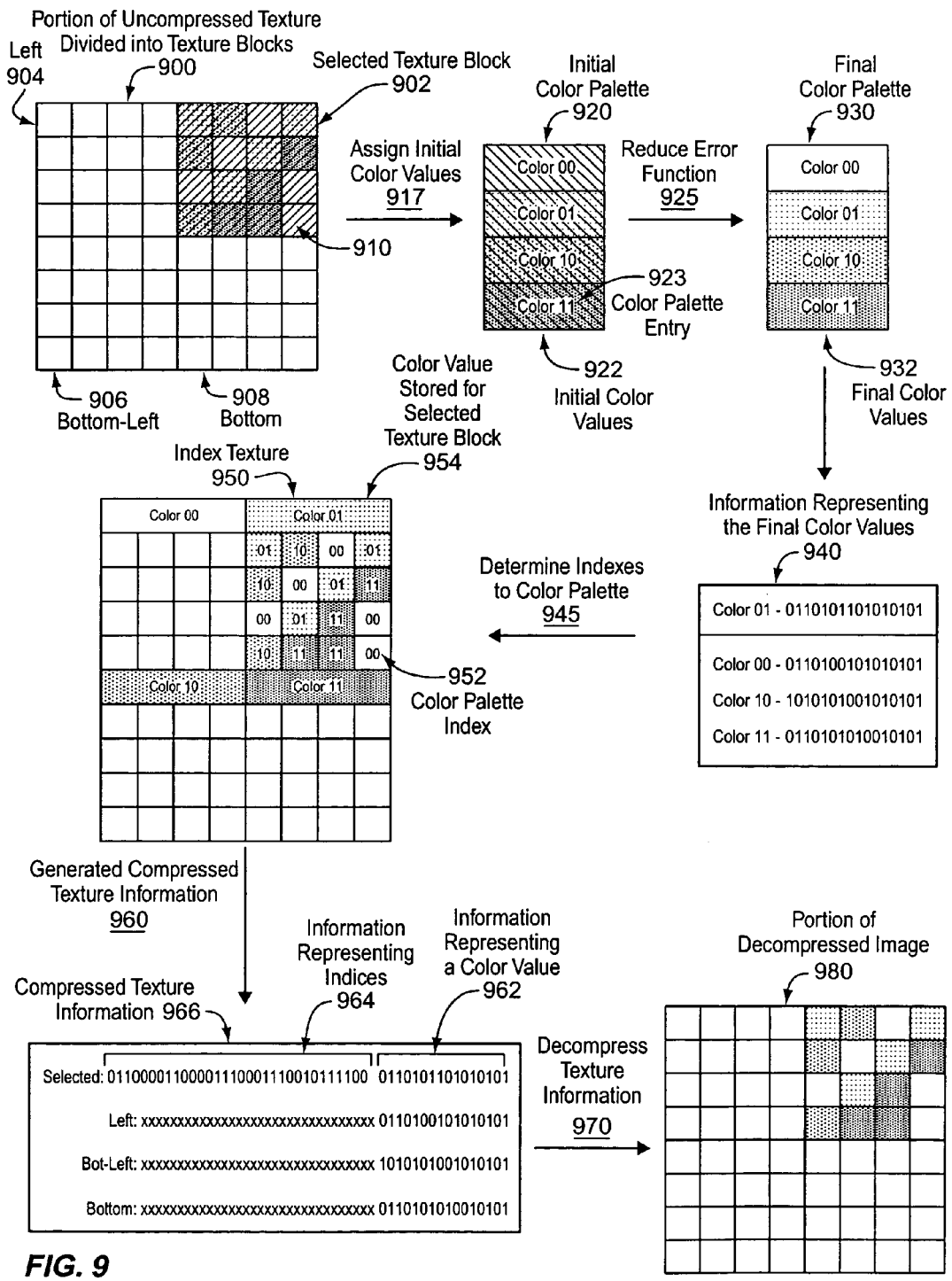
FIG. 9 conceptually illustrates a nodal scheme for representing the local palette pattern according to one embodiment.

FIG. 9 conceptually illustrates a procedure for compressing a texture according to one embodiment. This diagram is intended to illustrate the broader concept of the invention, rather than to show every expected operation. A portion of an uncompressed texture has been divided into four adjacent 4×4 texel texture blocks 900. The selected 902, left 904, bottom-left 906, and bottom 908 texture blocks will be used to generate a color palette and compress the selected texture block 902. Basic color values 910 of the sixteen texels in the selected texture block 902 are shown with hatching (left-to-right-increasing) to distinguish them from subsequent texel color values that will be discussed.

At block 917 initial color values 922 are assigned to color palette entries in an initial color palette 920. First, an average color value is determined for each of the sixteen texels in the selected 902, left 904, bottom-left 906, and bottom 908 texel blocks. Next, a local palette pattern connects left 904, selected 902, bottom-left 906, and bottom 908 texture blocks to color palette entries "color00", "color01", "color10", and "color11" respectively. The average color values for 904, 902, 906, and 908 are assigned to "color00", "color01", color10", and color11" as the initial color values 922. The initial color values 922 in are given different hatching (left-to-right-decreasing) to indicate that they may be different than any of the original texel color values 910.

At block 925 an error function is reduced by changing the initial color values 922 and subsequent color values assigned to the color palette entries. The error function is calculated based upon a squared difference between the original texel color values 910 and the best initial and subsequent color values 922. Preferably the error function is based upon all of the texels in the texture and is reduced by an optimization algorithm such as the Greedy Algorithm. A final color palette 930 is obtained when the error function has been minimized or reduced to an acceptable level of error. The final color palette 930 contains a final color value 932 in each of the four color palette entries "color00", "color01", "color10" and "color11".

At 940, the final color values 932 are represented by sixteen bits. Color palette entry "color01" corresponds to the selected texture block 902 and the bits representing the color value associated with "color01" will be stored for the selected texture block 902 during compression. The bits representing color values corresponding to the "color00", "color10", and "color11" palette entries will be stored for texture blocks 904, 906, and 908 respectively.

At block 945 color palette indices 952 are used to link each texel in the selected texture block 902 to the most similar final color value 932 in the final color palette 930. The resulting indexed texture 950 contains a plurality of color palette indices 952 that may be stored during compression along with one occurrence of each of the colors in the final color palette 930.

At block 960, compressed texture information 966 is generated for selected texture block 902. In this example, the compressed texture information 966 includes thirty-two bits representing sixteen two-bit indices 962 and sixteen bits representing the color value corresponding to color palette entry "color01" 964. This information is stored as compressed texture information for selected texture block 902. The indices in for the 904, 906, and 908 texture blocks link into different color palettes than the 902 texture block and so are shown with x's to designate unspecified information.

Compression of the left 904, bottom-left 906, bottom 908 and other texture blocks in the texture may be accomplished by the same procedure discussed above for compressing the selected 902 texture block. For simplicity, FIG. 9 does not emphasize the concept that the color value associated with and stored for a texture block may be used not only for the color palette of that texture block, but also for the color palettes of other adjacent texture blocks. At least in one embodiment, the color value stored for a texture block may be in the color palette of four adjacent texture blocks.

At block 970 decompression of the texture is initiated. First, compressed texture information for the 902, 904, 906, and 908 texture blocks is accessed (e.g., from a main memory). Information representing a local palette pattern (e.g., a matrix) must also be available. The local palette pattern links bits representing colors 964 in the compressed texture information to color palette entries in a reconstructed color palette. Once reconstructed, the color palette contains color values that correspond to each of the indices 962 stored in the compressed texture information. Accordingly, each of the sixteen texels in the selected texture block may be colored with the color value in the reconstructed color palette.

Compression Processing According to One Embodiment

Figure 10:
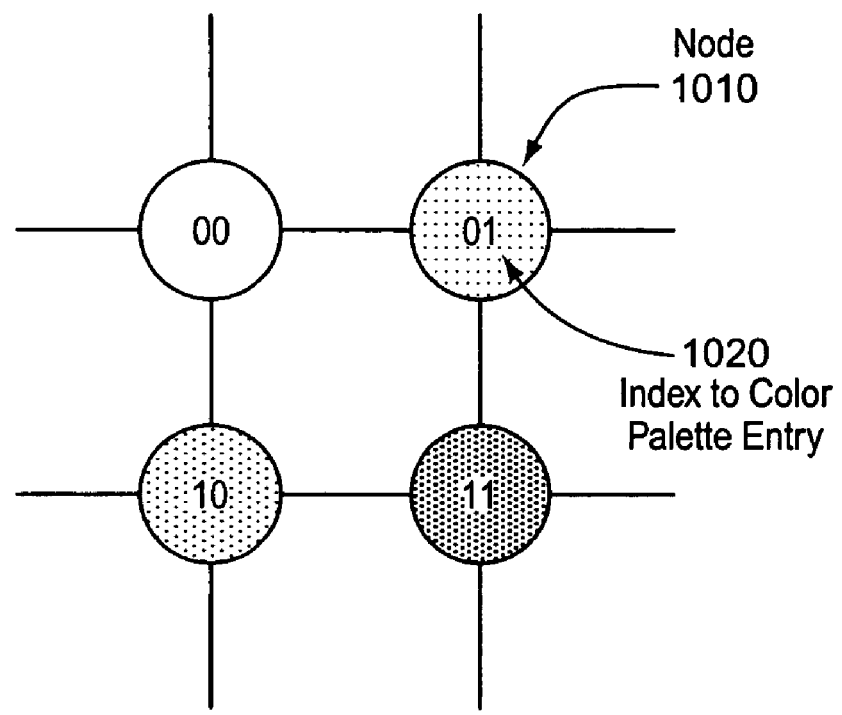
FIG. 10 conceptually illustrates a procedure for compressing a texture according to one embodiment.

This section will provide an example of compressing a texture using the local palette pattern shown in FIG. 7. FIG. 10 shows how the local palette pattern according to the embodiment shown in FIG. 7 may be implemented using nodes. The local palette pattern for this figure is based on storing one color for each texture block and creating the color palette for a selected texture block based upon the colors for the selected block, the bottom texture block, left texture block, and bottom left texture block. As shown, each of the corners of a selected texture block holds one color value from the color palette for that texture block. Since each node corresponds to four adjacent texture blocks, the same color will be included in the color palettes of four different texture blocks. A two-bit index identifies the corner and the color to be used to re-color texels when decompressing a texture.

This local palette pattern has several advantages. First, storing one color for each of four texture blocks provides allows two-bit indices to represent the color palette entries. Second, the texture blocks are adjacent, which allows the compression to take full advantage of regional color similarity. Third, the method is expected to provide good cache efficiency and reduced number of memory calls due to the texture blocks being closely packed. Finally, empirically there appears to be good ability to represent a sixteen texel block by four independent colors.

First, a texture is divided into a plurality of non-overlapping 4×4 texel texture blocks. Next, an initial color is assigned to each of the texture blocks. The initial color is the average color of the texels in the texture block. Then a test is performed to determine whether the same color value is assigned to two or more texture blocks. If so, another color value will be assigned to that texture block. A good way to assign the new color is to use one of the original texel colors for that block which is not already in the color palette.

Next an error function is calculated using the color values of the color palettes and the uncompressed color values for the texels. The error function is based on a sum over all texels in the image of the squared minimum difference between each original texel color value and the most similar color value in the available color palette for that texel. Then the error function is reduced by changing the color values assigned to one or more texture blocks according to the modified Greedy Algorithm discussed in Appendices A and B. Weights used in implementing the simplified Greedy Algorithm of Appendix B are provided in FIG. 11. Discussion of how these weights are used is provided in Appendix B.

Then, based upon the finalized color palette entries (i.e., the color values) the color value most similar to the uncompressed texel color value is determined for each texel. Next, each texel is indexed to the most similar color palette entry by storing information representing an index to this color palette entry.

Finally, for each texture block, information representing the color palette indices and information representing the color value assigned to the texture block are stored as part of the compressed texture information for that texture block.

This embodiment of the invention significantly reduces the amount of memory used to store a texture. The compression ratio for the described method is higher than for other prior art methods such as S3TC and others. Compression ratios of 8:1 are possible for RGB textures. Each block takes 16 bits (one RGB565 color), plus 16×2 bits (indices)=48 bits/block, which is 1:8 of uncompressed data. This is an eight times reduction of memory used for texel storage. Prior systems, including S3TC and others generally provide compression ratios around 6:1. Therefore, more detailed high-resolution scene images may be used or a larger number of textures may be stored. The same factor improves the external memory access bandwidth associated with texturing by a similar factor. This improves the rendering rate of the engine given the constraints of the system buses.

This embodiment of the invention provides several additional advantages over prior art compression-processing methods. First, the embodiment provides better image quality in most cases, because the four independently unique colors available for a selected texture block provides more color diversity than the two colors available in prior art methods. Secondly, the embodiment makes efficient use of cache and memory. All data is stored compactly and accessed in sequential order. Further, all data corresponding to a block is stored locally, so no codebooks or additional data may be necessary. Thus, hardware implementation of this technique will allow for a reduced amount of transmitted data and therefore will increase the fill-rate or allow rendering of more textures with the same fill-rate.

Decompression Processing

Compressed images need to be decompressed in order to be mapped onto the surface of a three-dimensional object or used for other purposes. The function of decompression is to use the reduced amount of color information that was stored during compression to give color values to some or all of the texels in the texture. Typically, the decompression of a texture will depend upon how the texture was compressed. For example, the number of colors stored for each texture block, and local palette pattern for the compression will impact how the image is decompressed. Accordingly, although the following discussion will not describe all of the embodiments that were described above for compression, decompression according to all of these embodiments and their equivalents is contemplated by embodiments of the present invention.

Figure 12:
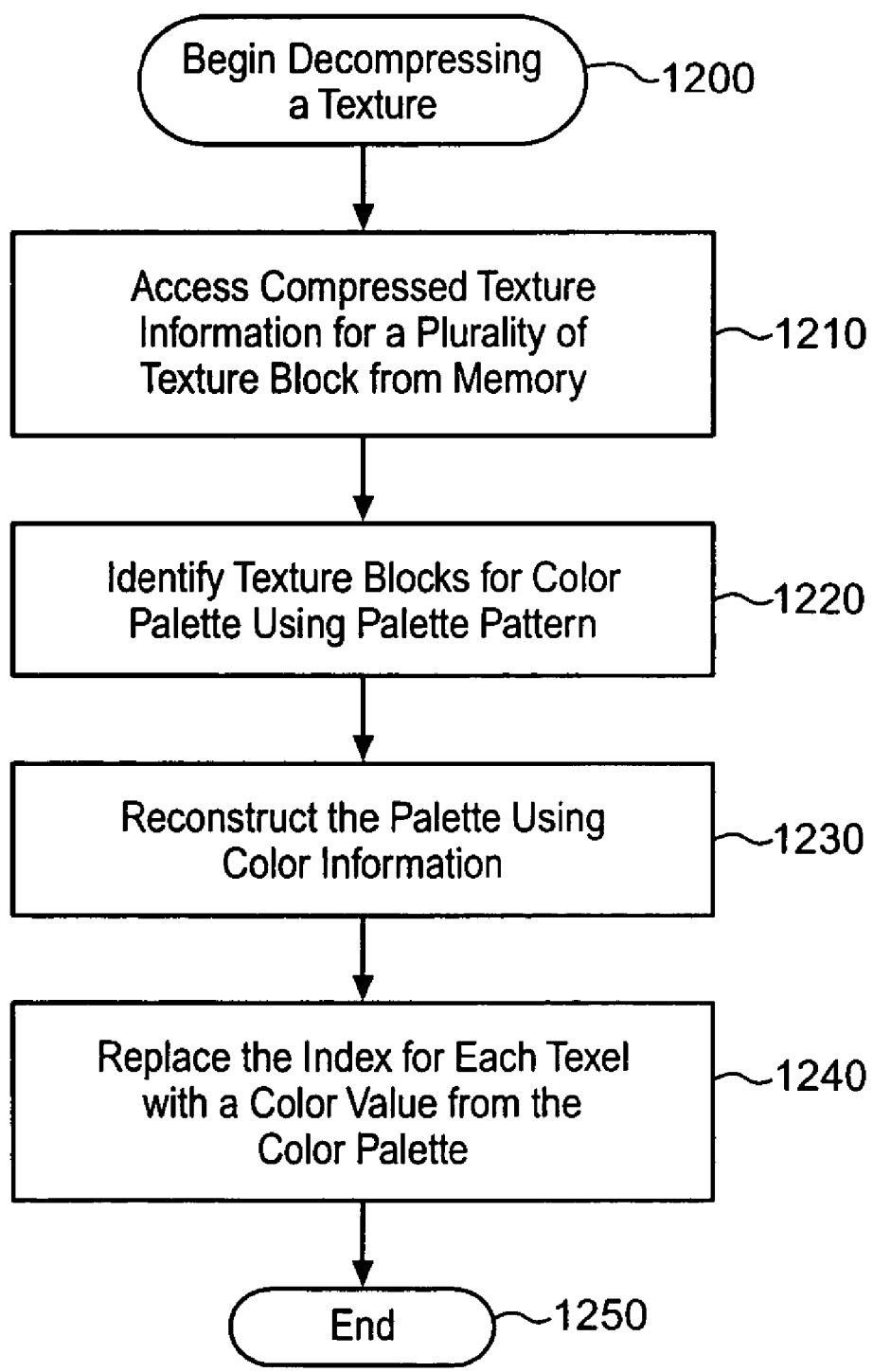
FIG. 12 is a glow diagram illustrating texture decompression processing according to one embodiment.

FIG. 12 provides a conceptualized flowchart for texture decompression. At block 1200 decompression of a compressed texture is initiated. In one embodiment, the entire texture may be decompressed. In other embodiments, only one or more texture blocks may need to be decompressed. Some embodiments may operate without decompressing an entire texture block, and may only decompress one or more texels from one or more texture blocks.

At block 1210, compressed texture information for a plurality of texture blocks is accessed from a memory. Typically, all of a compressed texture is accessed from memory and stored in a local area that is easily accessible to the decompression processing.

At block 1220, texture blocks needed to reconstruct a color palette for a selected texture block are identified. First, a texture block is selected for decompression. This texture block may comprise one or more texels that need to be mapped to a surface in a three-dimensional graphics application. Next, the local palette pattern used during compression is used to determine the other texture blocks that contain information for reconstructing the color palette for the selected texture block. The local palette pattern may be stored for each texture block, or it may be stored for a whole texture, or stored by some other means.

At block 1230, the color palette is reconstructed using information from the plurality of texture blocks. In one embodiment, the compressed texture information for each texture block includes one or more color values. For example, bits representing a single color value may be stored for the selected texture block and bits representing a different single color value may be stored for a second texture block. First, each of the color values for the texture blocks used in reconstructing the color palette are associated with a color palette entry in the color palette. The local palette pattern may specify which color palette entry corresponds with which texture blocks color value. In one embodiment, the reconstruction of the color palette may involve actually storing the color values in logical registers representing a color palette. In other embodiments, pointers or other means may be used to associate a color palette entry or the local palette pattern to the stored color values.

At block 1240, the index for each texel, which is used to associate each texel with a color value in the color palette, is used to assign color values to one or more texels in the selected texture block. In one embodiment, for each texel in the selected texture block the index for a first texel is identified in the compressed texture information, then the index is used to look up the color value in the entry of the color palette that matches that index. Then the color value in the palette is assigned to the texel.

This decompression processing can be done for some or all of the texels in a texture. When color values have been assigned to the requested texels, decompression is essentially completed. The texture information is then available to be, for example, mapped to a three-dimensional surface.

One further advantage of some embodiments of the present invention is fast and simple decompression. This is partly because in many embodiments the decompression does not use interpolation of colors in order to reconstruct the color palette. This simplicity increases the speed of decompression, making texture rendering appear smooth rather than jerky, and also makes the compression processing well suited for hardware implementation, such as in a graphics accelerator.

Figure 13:
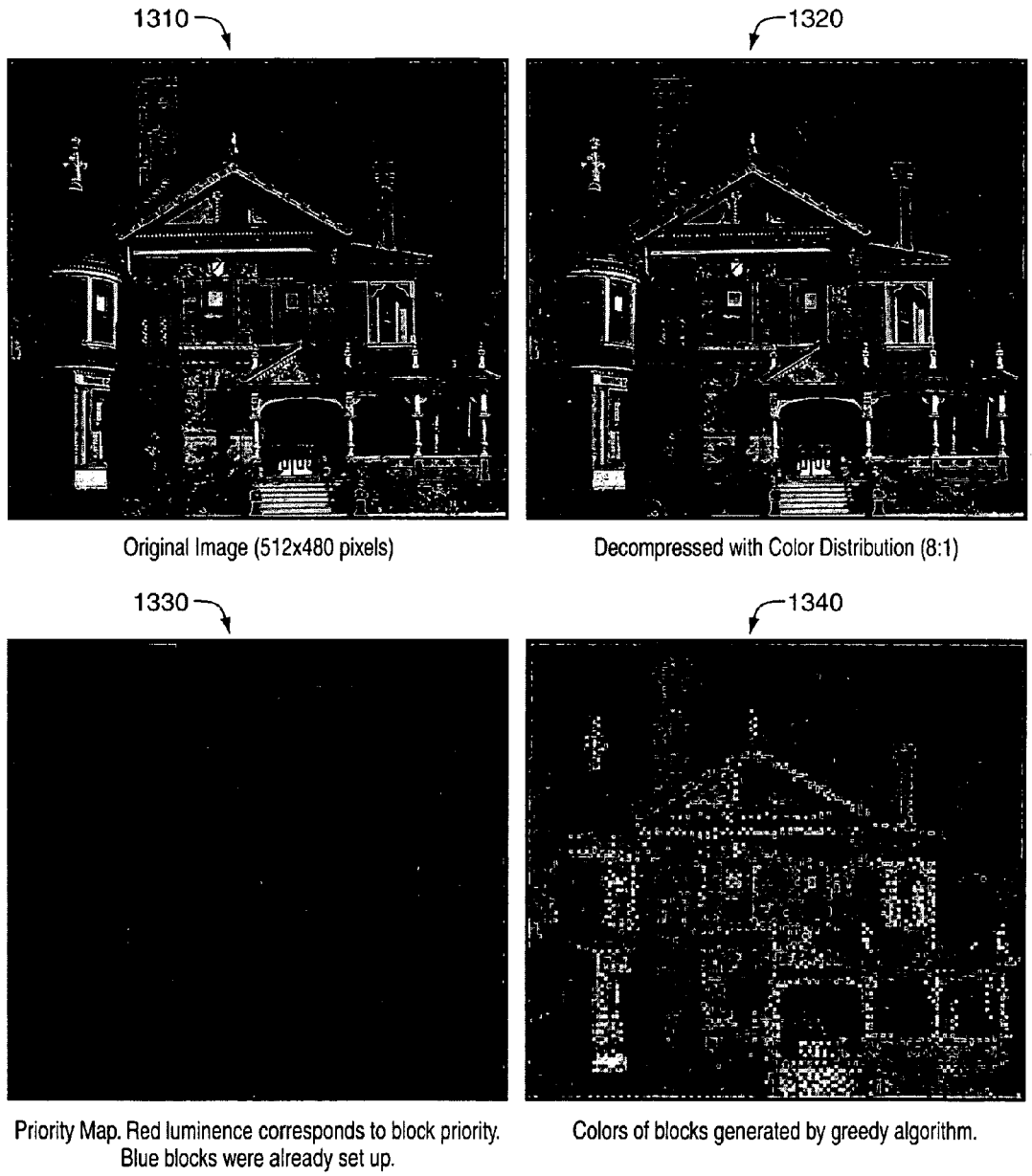
FIG. 13 conceptually illustrates an image before and after compression.

FIG. 13 shows an original full-color image of a house 1310 and a corresponding image 1320 compressed and decompressed according to one embodiment of the present invention. Shades of gray are used to represent the colors of the original image. Both 1310 and 1320 are shown at a resolution of 512×480 pixels. Compression was performed using an 8:1 compression ratio with optimization according to the Greedy Algorithm. Colors for texture blocks generated by optimization using the Greedy Algorithm are shown in a third image 1340. Also shown is a priority map 1330 where red luminescence (represented by a first shade of gray) corresponds to block priority. Blue blocks (represented by a second shade of gray) were already set up. Even though the example shown in FIG. 13 is not likely to be used for a texture, the embodiment works well and would work equally well or better on simpler textures. For one thing textures usually do not have the complicated color patterns and detail shown in images 1310-1340. FIG. 13 shows that even relatively complicated images can be compressed according to an embodiment of the present invention without substantially compromising the qualities of the original image.

Compression of MIP Maps

A MIP map for a texture includes a base map that corresponds directly to the texture map, as well as a series of filtered maps, wherein each successive map is reduced in size by a factor of two in each of the two texture map dimensions. For example, series of MIP maps may comprise a base MIP map that is eight-by-eight texels in size, and a series of MIP maps that are respectively four-by-four texels, two-by-two texels, and one texel in size. The texture mapping hardware may access texture data from any of the series of MIP maps. The determination of which map to access to provide the texel data for any particular pixel is based upon the number of texels to which the pixel maps. For example, if the pixel maps in one-to-one correspondence with a single texel in the texture map, then the base map is accessed. However, if the pixel maps to four, sixteen or sixty-four texels, then the maps two-by-two, four-by-four, or eight-by-eight maps are respectively accessed.

Those skilled in the art will recognize that the present invention is easily extended to texturing systems using MIP maps. In one embodiment each of the MIP maps is compressed by the method. In another embodiment the base MIP map is compressed and the others are averaged according to the base MIP map color values. Other embodiments are also possible. In one particular case, when exactly one color is stored in each four-by-four texel block, this particlular color may be used as a next level of MIP map.

Although a majority of the discussion of this application is devoted to texture compression, the present invention is also applicable to image compression. Reducing the amount of information used to represent a texture image may also be useful to represent other non-texture images. Accordingly, using only modifications that would be obvious to those skilled in the art, the present invention may be applied to compress images.

In conclusion, the present invention provides an approach for compressing images, including textures, by using a color palette based upon color information stored for another block or texture block. This approach provides for high compression ratios coupled with retaining more original image qualities than prior art techniques. In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Appendix A: Greedy Algorithm

This Appendix presents a formalized optimization method based upon the Greedy Algorithm. This method introduces the concept of local palette pattern for each texel. Therefore, it is not limited to any particular scheme of color distribution, and may be used for global palette construction in the case where each individual texel is indexed by the corresponding subset of palette entries, which is referred to as local palette.

The significant property of this approach is the pre-defined maximum number of iterations, which equals to the number of color values that are involved in at least one local palette. This strategy is more efficient than other methods in terms of time consumption.

The method constructs the global palette, which is understood as a depository for the entries of local palettes, only from those colors that are actually present in the original image (texture). This property may be important in some cases considering certain aspects of human vision system. The method can be modified so to remove this requirement, and Appendix C presents a method that does not impose this requirement.

Many variations on the general methodology presented herein are possible. For example, in some embodiments, color values associated with some texture blocks may be excluded from variation during optimization. This may be the case when a texels of a texture block or, group of texture blocks, have a single color value.

The method is not limited to any particular color representation, so any color model can be considered. Preferrably, the color space has a perceptually uniform or nearly perceptually uniform distance function. In practice, Euclidean metric with different weighs for RGB colors can be used as the adequate approximations of uniform color space.

The following notation will be used to develop the approach. Considering a finite color space $\Omega$, $\rho(.,.)$ denotes the distance function, which is assumed to be nearly perceptually uniform. $X=\{x_i \epsilon \Omega, i=1 \ldots N\}$ denotes the original texture of N elements. $Y=\{y_v \epsilon \Omega, v=1 \ldots K\}$ denotes the global palette (i.e. the set of colors that are involved at least in one local palette). $R=\{r_{iv} \epsilon \{0,1\}, i=1 \ldots N, v=1 \ldots K\}$ is the set of rules that define which entries from the global palette Y are to be taken as the local color palette entries for a texel. Thus, for a texel $x_i$, the local palette includes $y_v$ if and only if $r_{iv}=1$. The set of rules R may be dependent upon the local palette pattern and modifications may be required for certain local palette patterns. Equation (1) specifies that at least one entry of global palette is available for any texel.

$$\forall i \sum_{v=1 \ldots K} r_{iv} > 0. \quad (1)$$

$M=\{m_{iv} \epsilon \{0,1\}, i=1 \ldots N, v=1 \ldots K\}$ is an assignment matrix. It has exactly one value of '1' in each row. Position of '1' specifies which color from a global color palette is currently used for representing the corresponding texel. The assignment matrix M satisfies Equation (2), which is:

$$\forall i \sum_{v=1...K} r_{iv} m_{iv} = 1. \quad (2)$$

Thus, the formalized problem of texture compression is the following. Given an arbitrary image (texture) X and a set of rules R, the objective is to find the global palette Y and the corresponding assignment matrix M (complying with (2)), such that the error between the compressed image (3), $$X^* = MxY, \quad (3)$$

and the original image X is minimal (the symbol x denotes here a standard matrix multiplication).

Human perception of the color of each pixel depends on the color of neighboring pixels (in addition to the color of the perceived pixel). However, for the sake of simplicity we consider the simplest model of human vision that does not consider the contribution of neighbor pixels.

Thus, the overall error is defined by Equation (4), $$E(X, X^*) = \sum_{i=1...N} \rho\left(x_i, \sum_{v=1...K} m_{iv} y_v\right) \quad (4)$$

As was introduced previously, the proposed algorithm defines exactly one palette entry per iteration. Thus, assign a Boolean value to each entry specifying whether or not it has been set up. Denoting this values with $S=\{s_v \in \{0,1\}, v=1 \ldots K\}$, we state that before the algorithm begins all $s_v$ are set to 0, and in the end, they are all equal to 1.

For a given image X, and current state of palette Y with respect to S, the following key functions are introduced. $\epsilon(i, v)$ defined by Equation (5) indicates the error in pixel $x_i$ if it is represented by the palette entry $Y_v$ provided that $y_v$ is set ($s_v=1$) and available as a local palette entry according to R. If $y_v$ is not yet set up or not included in the local palette, $\epsilon(i, v)$ is equal to the value exceeding diameter of color space (we consider finite color spaces).

$$\varepsilon(i, v) = \begin{cases} \rho(x_i, y_v), & \text{if } s_v r_{iv} = 1 \\ \text{MAX\_VALUE}, & \text{otherwise} \end{cases} \quad (5)$$

$E=\{\epsilon_i, i=1 \ldots N\}$ is the set of errors for the current state of the palette construction. Each error is defined by Equation (6).

$$\epsilon_i = \min_v \epsilon(i, v) \quad (6)$$

The function $d\epsilon(v,x)$ defined by Equation (7) indicates the overall error decreases if the palette entry $y_v$ is set to the value of x and then considered as defined. For already defined palette entries $d\epsilon(v,x)$ equals 0.

$$d\varepsilon(v, x) = (1 - s_v) \sum_{i: r_{iv}=1} \chi(\rho(x_i, x) - \varepsilon_i), \quad (7)$$

where $\chi(t) = \begin{cases} t, & \text{if } t > 0 \\ 0, & \text{otherwise} \end{cases}$ The general idea of the algorithm is to find on each step the palette entry, that will maximally decrease overall error E if set up. This entry is considered defined, and all others (only those that may have changes by this assignment) should be recalculated to reflect the changes. The general idea of the algorithm can be expressed by the following steps:

(1) For each global palette entry $y_v$ (that is not yet set up) we have to do the following:
   a. Examine those texels, whose local palettes include $y_v$, and
   b. Choose the one texel that would provide maximal error decrease if placed in $y_v$. In other words, we pick up the most representative candidate for the palette entry. As a consequence of this step, only original colors are included in the global palette Y.
(2) From all candidates (one per entry) we select one that provides maximal decrease compared to candidates of other entries.
(3) Set up the selected entry and execute the loop.

This strategy is relatively simple and produces very good results on different types of textures. The efficiency may be greatly improved by storing once calculated texel errors $\epsilon_i$ and error decreases $d\epsilon_v = \max_{i: r_{iv}=1} d\epsilon(v,x,)$ in memory, and using them any time they are required for computations. Because setting up one palette entry on each step influences only limited number of texels, a relatively small number of errors and error decreases actually change and require recalculation.

Appendix B: Implementation of Greedy Algorithm f r Nodal Scheme of CD

In this Appendix we consider the nodal scheme of color distribution, as shown in FIG. 7, for which an image is decomposed into equal-sized blocks and all texels within each individual block have the same local palette pattern. For this scheme, the general Greedy Algorithm (Appendix A) may be implemented more efficiently. The algorithm is based on minimizing the average degradation of each texel (i.e., selecting node colors so that distances from each texel (in color metric space) to nearest available node is minimal). Although the algorithm does not produce the theoretical minimum error the practical results are quite sufficient.

As shown in the local palette pattern of FIG. 7, the present invention uses the same color value for color palettes of several adjacent blocks. Thus, the optimization procedure must analyze all blocks sharing a node to choose the preferred color value for that node. The algorithm provides a constant number of iterations equal to the number of texture blocks, since it sets up exactly one node per iteration minimizing overall error as much as possible. Nodes are assigned color values that are actually present in the original texture. This property is not required, but proved to result in compressed images of good visual quality.

As stated, the distance calculated from one color value to another may be based upon colors in RGB format or one of the standards established by CIE (Commission International de l'Eclairage) format. Weights, such as the exemplary weights in FIG. 11, may be used for distance calculations using RGB format. Absolute differences or sum of squared differences can be used. Alternatively, CIE color space may be used. In this case, texels should be converted beforehand and stored in the required format. Weighting factors are not required to calculate color value distances in CIE space. Because CIE provides a better distance function than RGB, based upon human vision considerations, this format is preferred in order to obtain better image quality. However, CIE slightly slows down compression, and in most cases the quality improvement is not significant.

The algorithm uses the following structures, which stand for individual texel and node, respectively:

```
struct TEXEL {
    COLOR Color;      // Can be RGB or CIE
    double Error;     // Error of representing it by current palette
};
struct NODE {
    COLOR Color;      // Can be RGB of L*u*v*(L*a*b*)
    double Priority;  // Node priority
    bool SetUp;       // true if this color has been set up
};
```

Initially, all nodes are marked as not set-up and all texel errors are set to the maximum possible. All of the adjacent texture blocks for a node are inspected. Next, a color value is determined that, if assigned to a node, would maximally reduce the overall texel error. This color value is then assigned to the node and priority is set to the aggregate error decrease.

The node priority indicates how an aggregate texel error would decrease if a corresponding color value is considered as a final color value for the palette. The algorithm should decrease the overall error as much as possible, so a node with maximum priority is determined and marked as set-up (considering not set-up nodes only). This color value is used in the local palette of adjacent texture blocks.

Texel errors in adjacent texture blocks need to be recalculated to incorporate the changed color values at a node. Since this can in return change the color values and priorities of other adjacent nodes, these errors should also be recalculated. This procedure of setting up a node with maximum priority, decreasing texel errors, and recalculating influenced nodes continues until all nodes are set up. Finally, when a proper color value has been assigned to every node, an index is given to each texel based upon a comparison of the uncompressed texel color value and the best matching color in the color palette for the texture block.

Texel Error Calculation

The error for each texel indicates how well the color values in the current color palette represent a texel. In the very beginning, no colors are set up in the nodes, so the error is set to a maximum (e.g., 256.0 for RGB).

```
Texel.Error = 256.0;
for (each Node from AdjacentNodes(Texel) ) {
    if ( Not Node.SetUp ) continue; // Skip not set-up nodes
    Distance = ColorDistance( Texel.Color, Node.Color );
    if ( Distance < Texel.Error ) Texel.Error = Distance;
}
```

Thus, minimal distances to the colors available in adjacent set-up blocks are stored as the texel error.

Node Priority and Color Calculation

Priority indicates how the average error would decrease if color values were set up for the corresponding node. It is calculated by the procedure shown in the following pseudocode:

```
Node.Priority = 0.0;         // Minimal value
for ( each Texel from AdjacentBlocks(Node) ) {
    ErrorDecrease = 0.0;     // Decrease accumulator
    for ( each Texel1 from AdjacentBlocks(Node) ) {
        Distance = ColorDistance( Texel.Color, Texel1.Color );
        if ( Distance < Texel1.Error )
            ErrorDecrease += Texel1.Error − Distance;
    }
    if ( ErrorDecrease > Node.Priority ) {
        Node.Color = Texel.Color;
        Node.Priority = ErrorDecrease;
    }
}
```

Thus, all colors available in adjacent blocks are considered. The color value providing the maximum error decrease is determined and placed in a node. Priority is set to error decrease.

Nodes set up algorithm

The algorithm sets up one node at a time, according to priority. This procedure is represented by the following pseudocode:

```
// Initialization
for ( all Texels ) Texel.Error = 256.0;
for ( all Nodes ) CalculatePriority( Node );
// main loop
while ( Not all Nodes are set up ) {
    Node = NodeWithMaxPriority( );
    Node.SetUp = True; // Set up node with maximum priority
    for ( each Texel from AdjacentBlocks(Node) )
        CalculateError( Texel );
    for ( each Node1 that shares the same block with Node )
        if( Not Node1.SetUp ) CalculatePriority( Node1 );
}
```

When all blocks are set up, local color palettes for each block are available, and colors can be substituted by indices. This completes the texture compression processing.

Texel Clustering

The speed of this algorithm can be further improved by preliminaiy clustering of the colors within each block. A simple algorithm is proposed for clustering, which produces sufficient results and works very fast considering that each time it needs to cluster sixteen points.

Denote a set of points in a metric space as X. The task is to find clusters not exceeding d in diameter and comprising all points from X. As few clusters as possible should be used. At each step, the algorithm finds the diameter [xy] of X. Then, it forms a cluster around x with diameter d and removes the covered points from X. The same procedure is also applied to y unless distance between x and y is less then d. In practice, this procedure works relatively well and is fast, although it does not construct a minimal set of clusters Thus, clusters can be treated in the same way as texels in the iterative compression algorithm pseudocode. The only difference would be storing the number of texels belonging to each cluster, since this information is required for proper calculation of $\epsilon_i$ and $d\epsilon_i$, which represents texel error and node priority. The use of preliminary clustering makes the iterative algorithm 2-5 times faster, because the number of arithmetic operations is significantly reduced.

Decompression Algorithm

This section presents an algorithm for extracting one texel from a texture compressed according to the present invention. Texture decompression involves extraction of the index for a reconstructing texel and retrieval of the corresponding palette entry, typically stored locally. If the whole block is to be reconstructed, the decoder may reconstruct the whole palette, the color values for which are supplied by neighbor blocks. Then, after palette reconstruction, the decoder can reconstruct each texel by using its index to the color palette.

Decompression of the data encoded by the described above technique can be implemented very efficiently. In fact, since color interpolation is not used, no arithmetic operations on colors are required. Thus, the proposed technique is simpler than many prior art approaches. However, attention must be given to memory management, since color data is not stored locally as much as with prior block decomposition approaches. A Pseudocode for decompression of textures is presented below. We assume here, that colors and block indices are stored as separate 2-dimentional arrays. However, interlaced storage or other storage means are also possible.

```
RGB565 GetTexel( int x, int y ) {
    block_x=x/4; block_y=y/4;
    index=GetBlockIndex(block_x,block_y);
    index=ExtractTexelIndex(index, x%4,y%4);
    if (index&1) block_x++; // shift left
    if (index&2) block_y++; // shift down
    return GetColor(block_x,block_y);
}
```

In the above pseudocode, GetBlockIndex ( ) and GetColor ( ) are functions that are used for retrieving the index of the block and required color from the corresponding arrays. Since decoding typically takes place during three-dimensional scene rendering, data obtained by calling these functions is likely to be used for decompression of the next texel. This allows for more efficient use of memory cache (either standard or specially designed), because previously loaded indices and colors may be quickly accessed while they are in the cache. ExtractTexelIndex ( ) is a function that extracts a two-bit index of the corresponding texel from the bits representing the indexes for all of the texels in the texture block.

Appendix C: Optimization By Iterative Conditional Mode

ICM (Iterative Conditional Mode) is another approach that can be used to optimize the color values for texels. ICM is conceptually similar to K-means clustering, which iterates through color space converging to the minimum of error function $E(X,X^*)$, defined by (4). The described method assumes that Euclidean metric is used in color space. This assumption, however, does not introduce any essential limitation on the general approach.

In the notation of Appendix A, if the global palette Y is defined, the assignment matrix M should comply with Equation (8) to minimize overall error for a given palette.

$$m_{iv} = \begin{cases} 1, & \text{if } v = \arg\min_{k:r_{ik}=1} \|x_i - y_k\|^2 \\ 0, & \text{otherwise} \end{cases} \quad (8)$$

On the other hand, if the assignment matrix M is fixed, palette entries may be obtained by Equation (9), which is simplified by noting that the first derivative of $E(X,X^*)$ with respect to $Y_v$ is zero. The objective is to find Y, so that $E(X,X^*)$ converges to a minimum. The evident solution is to differentiate B with respect to Y, and set the derivative to 0. This is how the formula below was obtained.

$$y_v = \frac{\sum_{i=1...N} m_{iv} x_i}{\sum_{i=1...N} m_{iv}} \quad (9)$$

Thus, the ICM-like algorithm alternately finds the assignment matrix for the fixed palette, and calculates palette colors as the median of the set of pixels that are indexed by this palette entry. This strategy is expressed by the following pseudocode:

```
M,Y CompressTexture( X,R ) {
    set y_v (v=1 ... K) to arbitrary colors;
    do {
        set m_iv (i=1 ... N, v=1 ... K) by (8);
        set y_v (v=1 ... K) by (9);
    } until (converged);
    return M,Y;
}
```

The ICM algorithm is quite efficient in most cases. However, it is known that this method frequently gets stuck at local minima, which should be carefully analyzed to get adequate performance. One strategy that may be applied in order to eliminate this problem may be found in On *Spatial Quantization of color images*, J. Ketterer at al., in Proc. of the European Conference on Computer Vision, 1998. Also, the ICM strategy can be accelerated by applying multiscale optimization techniques. For further information refer to Multiscale minimization of global energy functions in some visual recovery problems, Heitz et al., CVGIP: Image Understanding, 59:1, 1994.

What is claimed is:

1. A method comprising, for each of a plurality of blocks in an image, generating compressed information including information representing a single color value and information representing a plurality of color palette indices including at least one color palette index to a color represented in compressed information for another block in the image.

2. The method of claim 1, wherein the blocks comprise texture blocks, the image includes a texture, and the compressed information includes compressed texture information.

3. The method of claim 2, wherein generating the compressed texture information is done without determining sequences of repeating elements.

4. The method of claim 2, wherein the plurality of texture blocks comprise a plurality of 4×4 texel blocks.

5. A computer-readable medium having stored thereon data representing sequences of computer instructions that when executed cause a machine to:

generate compressed texture information for a first block in a texture, the compressed texture information including information representing a single color value and information representing a plurality of color palette indices, at least one of the plurality of color palette indices corresponding to a color value associated with a second block in the texture.

6. A method comprising:
dividing a texture into a plurality of non-overlapping texture blocks including a first texture block and a second texture block;
determining a color palette for the first texture block, the color palette including a plurality of color values including at least one color value stored for the second texture block; and
compressing the first texture block by determining indices for a plurality of texels in the first texture block to color values in the color palette and storing compressed texture information which includes these indices.

7. The method of claim 6, wherein the color palette further comprises a color value stored for the first texture block.

8. The method of claim 7, wherein the color palette further comprises a second color value stored for the first texture block.

9. The method of claim 6, wherein determining the color palette further comprises calculating a difference between an uncompressed texel color value and a color value in the color palette for that texture block, and reducing the difference by changing the color value to be stored for the second texture block.

10. The method of claim 6, wherein the texture comprises a plurality of two-dimensional textures and the first texture block is contained in one of the two-dimensional textures.

11. A computer system comprising:
a bus;
a memory coupled to the bus;
a network interface device coupled to the bus;
a processor coupled to the bus; and
computer instructions stored on a computer-readable medium that when executed cause the processor to generate compressed texture information for a block in an image, the compressed texture information including information representing a single color value and information representing a plurality of color palette indices including an index to a color value associated with another block in the image.

* * * * *